United States Patent [19]
Williamson

[11] 3,885,434
[45] May 27, 1975

[54] FLOWMETER
[75] Inventor: Donald E. Williamson, Miami, Fla.
[73] Assignee: Cordis Corporation, Miami, Fla.
[22] Filed: Jan. 24, 1974
[21] Appl. No.: 436,235

[52] U.S. Cl............................................. 73/194 B
[51] Int. Cl............................ G01f 1/00; G01p 5/00
[58] Field of Search........... 73/194 R, 194 E, 194 B, 73/205 R, 207

[56] References Cited
UNITED STATES PATENTS

| | | | |
|---|---|---|---|
| 2,078,837 | 4/1937 | Carter | 73/194 |
| 2,453,376 | 11/1948 | Lagasse | 73/194 |
| 3,126,739 | 3/1964 | Whitehill | 73/205 |
| 3,605,741 | 9/1974 | Spencer | 73/194 |

FOREIGN PATENTS OR APPLICATIONS

| | | | |
|---|---|---|---|
| 329,384 | 11/1920 | Germany | 73/194 |

Primary Examiner—Herbert Goldstein
Attorney, Agent, or Firm—Sughrue, Rothwell, Mion, Zinn and Macpeak

[57] ABSTRACT

A flowmeter includes only a single moving part, a ball, in a tube, and without mechanical coupling. The ball is prevented from moving axially of the tube by a stop, but is of such a size relative to the tube that flow past the ball causes rotational and lateral movement which is proportional to the rate of flow and is detected from outside the tube.

7 Claims, 3 Drawing Figures

FLOWMETER

BACKGROUND OF THE INVENTION

1. Field of the Invention

This invention relates to improvements in rate of flowmeters for measuring fluid flow within a tube.

2. Description of the Prior Art

Various devices are known in the prior art for measuring the rate of flow of a fluid within a tube. See, for example, U.S. Pat. Nos. 2,453,376; 1,935,445; 3,193,816; 3,605,741. Such prior art devices have various drawbacks of accuracy, complexity, orientation requirements, etc. There is need in the art for simple, rugged, versatile, accurate and inexpensive flowmeters without these drawbacks.

SUMMARY OF THE INVENTION

This invention provides an extremely rugged and simple (one moving part) flowmeter which is both accurate and inexpensive, and which can be operated at any orientation. The flowmeter consists simply of a tubular conduit for the flow of fluid (liquid or gas) to be measured, a ball in the tube of lesser diameter than the inside diameter of the tube, a stop to prevent the ball from moving longitudinally of the tube with the flow of fluid but allowing the ball free movement laterally of the tube due to forces on the ball produced by forces in accordance with Bernoulli's Theorem, and means to detect and measure such lateral movement of the ball. This means, for example, could include a light source, photocell detector, and electronic counter.

DESCRIPTION OF THE PREFERRED EMBODIMENT

Figure 1:
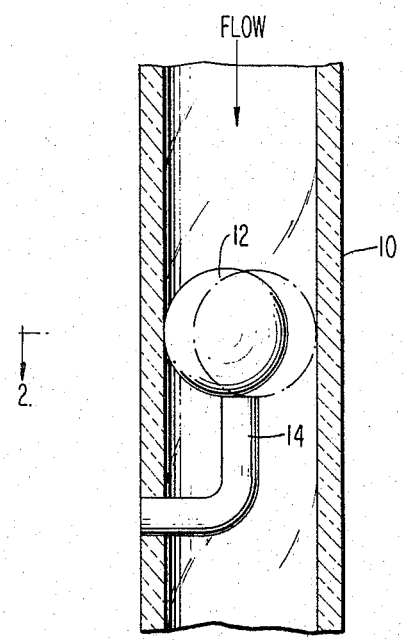
FIG. 1 is a side elevation view of the flowmeter of this invention with the tube shown in section.

The flowmeter of this invention comprises a tubular conduit 10, a movable ball 12, a ball stop 14, and means 16 to detect movement of the ball.

The tube 10 may be glass, as shown, clear plastic or other transparent material if it is desired to detect movement of the ball by optical means. It could, however, be of other material, if ball movement were to be detected by magnetic, capacitive, or vibration sensing means.

The ball 12 is spherical and has an outer diameter less than the inner diameter of the tube 10 by an amount sufficient to allow flow around the ball.

The ball stop has a centrally located, preferably flat surface whose diameter is approximately equal to or greater than the difference between the tube and ball diameters. This flat surface stop 14 may be supported from the wall of the tube in any convenient means which does not obstruct flow.

When fluid is baused to flow, as shown by the arrow in FIG. 1, most of the flow will be past the right side of the ball which is shown in contact with the lefthand wall of the tube. There will, of course, be no flow where the ball is in contact with the tube. According to Bernoulli's Theorem, this will result in a reduction in pressure on the right side of the ball causing it to move toward the right. When the ball has moved all the way to the righthand side of the tube, as shown by the phantom lines, the situation is reversed. The reduced pressure will now be at the left side of the ball and the ball will be therefore caused to move back to the left toward its original position.

Figure 2:
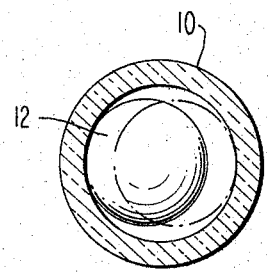
FIG. 2 is a sectional view taken along line 2—2 of FIG. 3.

FIG. 2 is a view along the axis of the tube in the direction of flow, again showing the motion of the ball back and forth across the tube for the reasons explained above.

Due to the mass of the ball, turbulence, and other factors, the system is unstable and there is no possibility of the ball finding a central location and remaining still. Also, in the flowmeter disclosed, there is no constraint on the motion of the ball within the tube so that the simple motion diametrically across the tube would not be maintained.

Figure 3:
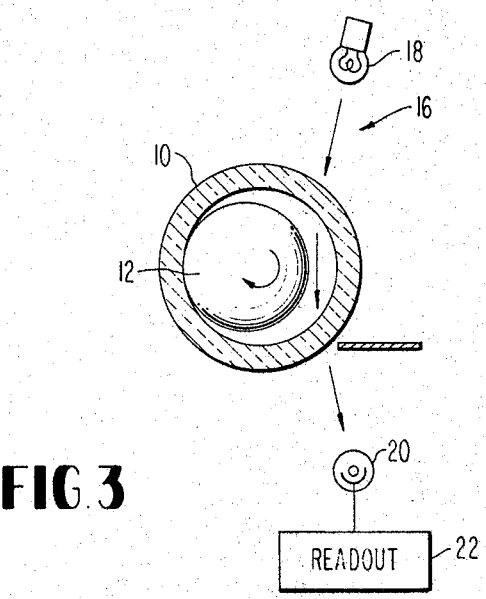
FIG. 3 is a view similar to FIG. 2, further showing the means for detecting and quantitizing movement of the ball caused by the flow of fluid.

Without such constraints, the system will behave as shown in FIG. 3, where the arrow indicates that the ball actually rolls around the inside of the tube. As a result of friction between the ball and the walls of the tube, the ball also is seen to rotate about its own vertical axis.

In the absence of any constraints on the ball 12 other than the flat surface of the stop 14 against which it is pressed by the fluid flow, for the purposes of this description (of the motion of a sphere in a cylindrical tube), the following terminology will be used:

Rotation: the turning of the sphere on its own axis caused at least in part by friction with the wall of the tube.

Revolution: the circular motion of the sphere with the axis of the tube as a center.

Motion of the ball starts at very low flow rates for the structures examined, and the rate of revolution shortly becomes a linear function of flow velocity.

The motion of the ball within the tube can be detected in various ways. If the tube can be transparent and the liquid moderately so, the simple method shown in FIG. 3 is quite effective. In this method, light from a source 18 is caused to pass through the fluid at one side of the tube. When the ball moves into the light beam, the light beam is occluded. These variations in light intensity are picked up by a photocell 20. A digital readout 22 is provided. Since the readout is digital and consists of the frequency with which the ball occludes the light beam, very simple circuitry (one battery and one resistor) is all that is required to obtain adequate input into a commercial frequency counter. The frequency counter then gives instantaneous readings (depending upon its sampling rate) of revolution frequency and consequently, with a suitable calibration factor, fluid flow rate. In addition, mass flow can be determined by counting the number of times the ball occludes the light beam over a certain period of time. Note that this digital output completely assures that the measuring equipment outside of the tube will not have any affect upon the accuracy of measurement. The precision of the measuring system is therefore perfect.

Several devices made in accordance with this invention have been constructed and tested. They perform in accordance with the above description. The tube was formed by drilling a hole having an inside diameter, for example, of 0.271 inch, through a slab of Plexiglas. The ball was a commercially available Nylon ball having a diameter of 0.250 inches. The support for the ball was a 3/32 inch stainless steel rod which crossed the bore of the tube transversely, the curvature of this support apparently having little effect on the motion of the ball. The light source was a subminiature incandescent lamp placed in the appropriate position and without any colliminating or focusing optics. The photodetector was a Fairchild FPM100 appropriately placed to receive the light, supplied with 4 volts DC in series with a 10,000 ohm resistor. A commercial frequency counter was connected directly across the 10K resistor. The baffle consisted of a narrow slot milled into the Plexiglas and filled with an opaque material. With a crude set-up for measuring flow rate, this system produced excellent linearity, particularly over a range from about 400 to 800 milliliters per minute, the upper figure being the maximum rate which could be delivered by the pump in use. The fluid used was water. With a Nylon ball, the weight of the ball appears to have little effect and the reading is not affected by placing the system horizontally instead of vertically. For the experiment described above, the frequency of revolution at 810 milliliters per minute was 340 Hz. The relationship between flow and frequency of revolution is a function of the difference in diameter between the ball and the tube. This provides a convenient method of calibration and/or adjusting the scale factor of the flowmeter. To accomplish this, the tube is made slightly conical (tapered) and the ball stop is arranged to be moved longitudinally in the taper with the detection system arranged to follow the ball as the stop is moved. If the application requires, the calibration of the flowmeter can be very accurately adjusted by this means.

Parameters of the system will include, but may not be restricted to, tube diameter, ball diameter, ball mass, method of support, and viscosity of the fluid.

An orientation of the device with flow in an upward direction as required by some prior art flowmeters does not exist for this system. Indeed for the flow rates investigated, using a plastic ball of Nylon or Teflon, the readout is independent of position including complete inversion of the flowmeter. This is clear from the symmetrical geometry of the device, making the effect of gravity a secondary consideration as long as the forces provided by the fluid are large compared with the effects of gravity. Should the ball be constructed of a material having a specific gravity equal to that of the fluid being measured, the effect of gravity would be, of course, zero.

It should be noted that using a Nylon or Teflon ball in the construction described, the system is operative with air.

Another advantage is that no mechanical communication to the space outside the tube is required. If an opaque tube, such as metal, is required, revolution of the ball can be detected by any of various methods such as magnetic, or vibration caused by the revolution of the ball. If the tube can be a dielectric, but must be opaque, capacitive methods can be used. Should the fluid be of moderately opaque nature, such as blood, the close proximity to the wall of a transparent tube of a white or reflecting ball can be detected by optical methods.

Electrical or optical detection of the revolution of the ball can also be achieved even though the tube is opaque by using the ball stop as the sensing conduit. For instance, the stop can be made of a fiber optics bundle and the "image" of the ball detected externally. If the ball is conductive, contacts formed in the surface of the stop will indicate the passage of the ball. If the ball is a dielectric, the change in the capacitance between the electrodes will indicate revolution of the ball.

This is an almost ideally simple structure, and the construction of the flowmeter described above is easily carried out with the simplest of commercially available materials.

I claim:

1. A flowmeter for measuring the flow of fluid, comprising:
   a. a tube for the flow of fluid to be measured,
   b. a spherical ball within the tube having a diameter less than the internal diameter of the tube by an amount sufficient to allow a significant amount of fluid to flow past the ball causing the ball to move,
   c. a stationary ball stop positioned in the tube downstream of the ball in the direction of flow preventing movement of the ball in the direction of flow, flow of fluid in the tube past the ball restrained only by the stop and tube walls causing the ball to partake of rotational movement and revolutional movement having a lateral oscillatory component of movement with respect to the axis of the tube which is proportional to the flow of fluid, and
   d. means for detecting the lateral oscillatory component of movement of the ball in the tube without being mechanically connected to the ball.

2. A flowmeter as defined in claim 1, wherein the tube is transparent and the means for detecting movement is an optical means.

3. A flowmeter as defined in claim 2 wherein the optical means utilizes a photocell and digital readout means.

4. A flowmeter as defined in claim 2 wherein the optical means utilizes a photocell and analog frequency determining means.

5. A flowmeter as defined in claim 1, wherein the means for detecting movement of the ball is capacitive electronic means.

6. A flowmeter as defined in claim 1, wherein the ball stop is a member positioned centrally of the tube with a flat surface contacting the ball.

7. A flowmeter as defined in claim 6, wherein the flat surface is circular with a diameter at least equal to the difference between the tube and ball diameters.

* * * * *